US011399386B2

(12) United States Patent
Takeda et al.

(10) Patent No.: US 11,399,386 B2
(45) Date of Patent: Jul. 26, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/482,591

(22) PCT Filed: Feb. 1, 2018

(86) PCT No.: PCT/JP2018/003325
§ 371 (c)(1),
(2) Date: Jul. 31, 2019

(87) PCT Pub. No.: WO2018/143317
PCT Pub. Date: Aug. 9, 2018

(65) Prior Publication Data
US 2019/0357248 A1 Nov. 21, 2019

(30) Foreign Application Priority Data
Feb. 1, 2017 (JP) .............................. JP2017-017128

(51) Int. Cl.
H04W 72/12 (2009.01)
H04L 27/26 (2006.01)
(52) U.S. Cl.
CPC ..... H04W 72/1284 (2013.01); H04L 27/2607 (2013.01)
(58) Field of Classification Search
CPC .... H04L 27/2607; H04L 27/26; H04W 72/12; H04W 72/04; H04W 72/1284
See application file for complete search history.

(56) References Cited

U.S. PATENT DOCUMENTS

2011/0228863 A1 9/2011 Papasakellariou et al.
2012/0039286 A1* 2/2012 Okubo ................. H04L 5/0016
370/329

(Continued)

FOREIGN PATENT DOCUMENTS

CN 105898872 A 8/2016
JP 2013-516874 A 5/2013

(Continued)

OTHER PUBLICATIONS

International Search Report issued for PCT/JP2018/003325, dated Apr. 10, 2018 (5 pages).

(Continued)

Primary Examiner — Anez C Ebrahim
(74) Attorney, Agent, or Firm — Osha Bergman Watanabe & Burton LLP

(57) ABSTRACT

The present invention is designed so that, even when a demodulation reference signal for an uplink data channel is multiplexed in a short TTI, this demodulation reference signal can be transmitted adequately. A user terminal according to one aspect of the present invention has a receiving section that receives information about the number of combs that are supported, and a control section that controls transmission of a demodulation reference signal for an uplink data channel in a second transmission time interval (TTI), which is shorter than a first TTI, and the control section maps the demodulation reference signal to a comb-shaped resource set, and maps the uplink data channel to a frequency resource of a bandwidth associated with the number of combs supported.

7 Claims, 8 Drawing Sheets

(56) References Cited

U.S. PATENT DOCUMENTS

| | | | |
|---|---|---|---|
| 2012/0281656 A1 | 11/2012 | Hooli et al. | |
| 2016/0112994 A1* | 4/2016 | Wang | H04W 72/042 370/329 |
| 2016/0374060 A1* | 12/2016 | Lim | H04W 72/042 |
| 2017/0317794 A1* | 11/2017 | You | H04L 5/0051 |
| 2019/0124675 A1 | 4/2019 | Gao et al. | |

FOREIGN PATENT DOCUMENTS

| | | |
|---|---|---|
| JP | 2013-526108 A | 6/2013 |
| JP | 2016519485 A | 6/2016 |
| WO | 2014161142 A1 | 10/2014 |

OTHER PUBLICATIONS

Written Opinion issued for PCT/JP2018/003325, dated Apr. 10, 2018 (4 pages).
MediaTek Inc.; "UL DMRS design for short TTI"; 3GPP TSG RAN WG1 Meeting #86bis R1-1609822; Lisbon, Portugal, Oct. 10-14, 2016 (8 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Notice of Reasons for Refusal issued in Japanese Application No. 2018-565634, dated Jun. 9, 2020 (8 pages).
Extended European Search Report issued in counterpart European Patent Application No. 18748274.0, dated Dec. 14, 2020 (12 pages).
Ericsson; "Design aspects of sPUSCH"; 3GPP TSG-RAN WG1 #87, R1-1611522; Reno, USA; Nov. 14-18, 2016 (4 pages).
CATT; "Discussion on DMRS design for sPUSCH"; 3GPP TSG RAN WG1 Meeting #87, R1-1611358; Reno, USA; Nov. 14-18, 2016 (8 pages).
Office Action in counterpart Russian Patent Application No. 2019125985/07(050980) dated Apr. 26, 2021 (14 pages).
Office Action issued in Chinese Application No. 201880009755.4; dated Sep. 26, 2021 (12 pages).
Office Action issued in Indian Application No. 201937030993 dated Dec. 24, 2021 (7 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10," "LTE Rel. 11," "LTE Rel. 12," etc.) have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "Nx (New radio access)," "FX (Future generation radio access)," "LTE Rel. 13," "LTE Rel. 14" or "LTE. Rel. 15" and so on) are under study.

In existing LTE systems (for example, LTE Rel. 13 or earlier versions), downlink (DL) and/or uplink (UL) communication are performed using 1-ms transmission time intervals (TTIs) (also referred to as "subframes" and so on). These 1-ms TTIs are the time unit for transmitting one channel-encoded data packet, and serve as the unit of processing in, for example, scheduling, link adaptation, retransmission control (HARQ-ACK: Hybrid Automatic Repeat reQuest-ACKnowledgement) and so on.

Furthermore, in existing LTE systems, in a TTI of a certain carrier (CC (Component Carrier), cell, etc.), a time field for a DL control channel, and a time field for a data channel (DL data channel and/or UL data channel), which is scheduled by downlink control information (DCI) transmitted in this DL control channel, are provided. In the time field for DL control channels. DL control channels are arranged throughout the system band.

Furthermore, in existing LTE systems, in a TTI of a carrier. UL control channels for communicating uplink control information (UCI: Uplink Control Information) are disposed to both end regions of the system band, and UL data channels are disposed in regions other than the both end regions.

Here, in existing LTE systems, for example, the DL control channel is the PDCCH (Physical Downlink Control Channel), the UL control channel is the PUCCH (Physical Uplink Shared Channel), the DL data channel is the PDSCH, and the UL data channel is the PUSCH.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Now, NR is under study to introduce TTIs having different time durations than 1-ms TTIs of existing LTE (for example, LTE Rel. 8 to 13) (for example, a TTI that is shorter than a 1-ms TTI (also referred to as a "short TTI").

When a UE transmits data in a short TTI, it is preferable to transmit the demodulation reference signal (DMRS: DeModulation Reference Signal) to use to demodulate the data symbol before, in or after the short TTI. A study is in progress to multiplex this DMRS in the same or overlapping resources in a plurality of UEs.

However, in existing LTE, there are no rules pertaining to short TTIs, and it is not clear what DMRS configuration is appropriate. Also, if existing transmission power control method is applied to DMRSs for short TTIs, it may be difficult to separate DMRSs for multiple UEs at the base station. Failure to introduce proper DMRS configurations and power control may lead to a degradation of communication throughput, a deterioration of the quality of communication and so on.

The present invention has been made in view of the above, and it is therefore an object of the present invention to provide a user terminal and a radio communication method, whereby, even when a demodulation reference signal for an uplink data channel is multiplexed in a short TTI, this demodulation reference signal can be transmitted adequately.

Solution to Problem

A user terminal according to one aspect of the present invention has a receiving section that receives information about the number of combs that are supported, and a control section that controls transmission of a demodulation reference signal for an uplink data channel in a second transmission time interval (TTI), which is shorter than a first TTI, and the control section maps the demodulation reference signal to a comb-shaped resource set, and maps the uplink data channel to a frequency resource of a bandwidth associated with the number of combs supported.

Advantageous Effects of Invention

According to the present invention, even when a demodulation reference signal for an uplink data channel is multiplexed in a short TTI, this demodulation reference signal can be transmitted adequately.

DESCRIPTION OF EMBODIMENTS

Figure 1:
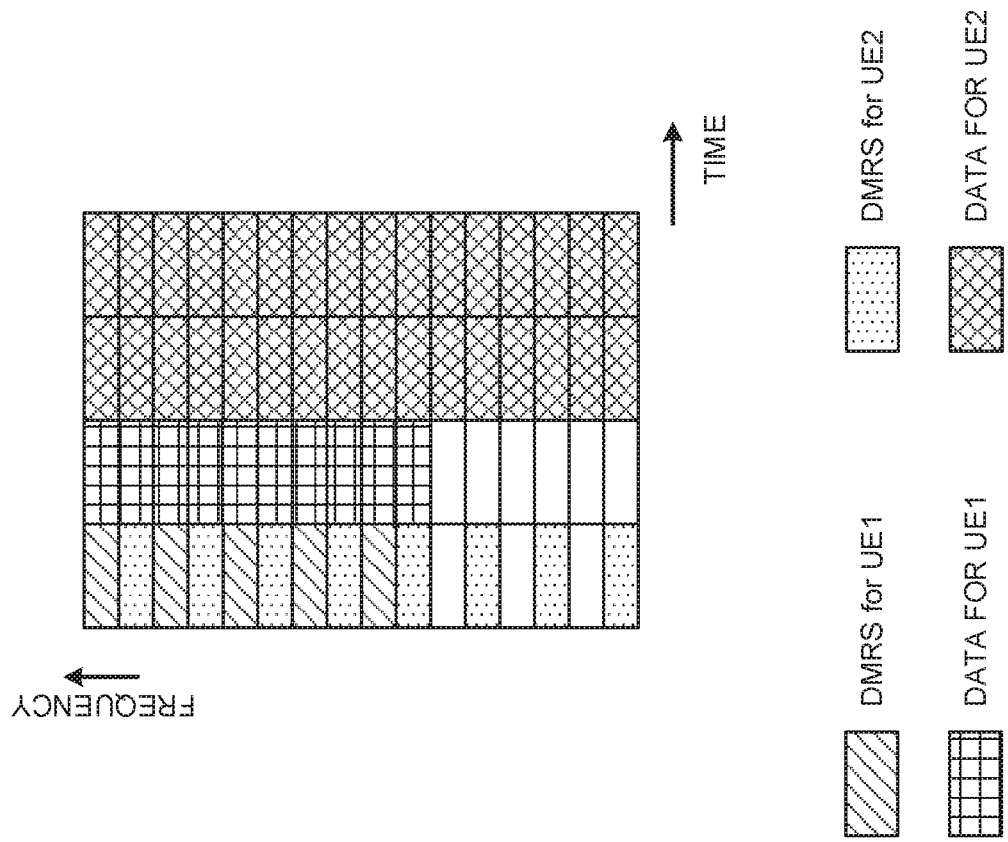
FIG. 1 is a diagram to show an example of resource mapping for IFDMA-based DMRSs.

To provide a method of reducing latency in communication in LTE, a study is presently conducted to control transmission/receipt of signals by introducing shortened TTIs (sTTIs), which have shorter durations than existing transmission time intervals (TTIs) (for example, subframes (1 ms)). Also, in 5G/NR, a study is in progress to allow a UE to use different services simultaneously. In this case, the duration of TTIs may be changed depending on services.

Note that a TTI may represent the time unit for use when transmitting/receiving transport blocks for transmitting/receiving data, code blocks and/or codewords. Assuming that a TTI is provided, the period of time (for example, the number of symbols) where the transport blocks, the code blocks and/or the codewords of data are actually mapped may be shorter than the TTI.

For example, when a TTI is formed with a predetermined number of symbols (for example, fourteen symbols), the transport blocks, the code blocks and/or the codewords of transmitting/receiving data can be transmitted and received in one or a predetermined number of symbol periods among these. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

In this way, in either LTE or NR, both long TTIs and short TTIs may be used for transmission and/or receipt in UEs.

A long TTI refers to a TTI having a longer time duration than a short TTI (for example, a TTI having a time duration of 1 ms, like existing subframes) (TTIs in LTE Rel. 8 to 13)), and may be referred to as a "normal TTI (nTTI)," a "1-ms TTI," a "normal subframe," a "long subframe," a "subframe," a "slot," a "long slot," etc. Furthermore, in NR, a long TTI may be referred to as a "TTI with a lower (smaller) subcarrier spacing" (for example, 15 kHz).

A long TTI, for example, has a time duration of 1 ms, and is comprised of fourteen symbols (in the event a normal cyclic prefix (CP) is used) or comprised of twelve symbols (in the event an enhanced CP is used). A long TTI may be suitable for services that do not require strict latency reduction, such as eMBB and MTC.

In existing LTE (for example, LTE Rel. 8 to 13), channels that are transmitted and/or received in TTIs (subframes) include a downlink control channel (PDCCH: Physical Downlink Control Channel), a downlink data channel (PDSCH: Physical Downlink Shared Channel), an uplink control channel (PUCCH: Physical Uplink Control Channel), a downlink data channel (PUSCH: Physical Uplink Shared Channel) and so on.

A short TTI refers to a TTI having a shorter time duration than a long TTI, and may be referred to as a "shortened TTI," a "partial TTI (partial or fractional TTI)," a "shortened subframe," a "partial subframe," a "minislot," a "subslot" and so on. Also in NR, a short TTI may be referred to as a "TTI with a higher (larger) subcarrier spacing (for example, 60 kHz)."

A short TTI is comprised of, for example, fewer symbols (for example, two symbols, seven symbols, and so on) than a long TTI, and the time duration of each symbol (symbol duration) may be the same as that of a long TTI (for example, 66.7 μs). Alternatively, a short TTI may be comprised of the same number of symbols as a long TTI, and the symbol duration of each symbol may be shorter than in a long TTI.

When using short TTIs, the time margin for processing (for example, encoding, decoding, etc.) in UEs and/or base stations grows, so that the processing latency can be reduced. Also, when short TTIs are used, it is possible to increase the number of UEs that can be accommodated per unit time (for example, 1 ms). Short TTIs may be suitable for services that require strict latency reduction, such as URLLC.

A UE in which short TTIs are configured would use channels of shorter time units than existing data and control channels. In LTE and NR, for example, as shortened channels to be transmitted and/or received in short TTIs, a shortened downlink control channel (sPDCCH: shortened PDCCH), a shortened downlink data channel (sPDSCH: shortened PDSCH), a shortened uplink control channel (sPUCCH: shortened PUCCH) and a shortened downlink data channel (sPUSCH: shortened PUSCH) and so on are under research.

Now, a study is in progress to map data symbols of sPUSCH only within one short TTI. It is preferable that demodulation reference signals (DMRS) for use for demodulating the data symbols are transmitted either before, in and after the short TTI. That is, data symbols and DMRSs may be time-division-multiplexed (TDM: Time Division Multiplexing). Note that data symbols and DMRSs may be frequency-division-multiplexed as well (FDM). Also, data symbols and DMRSs may be mapped to radio resources that are continuous in time and/or frequency, or mapped to noncontiguous (nonadjacent) radio resources.

Presuming cases where DMRSs may be mapped in uneven frequency resources (for example, frequency resources overlapping partially, frequency resources in which at least one of the lower end and the upper end of the allocated frequency resources are different) among multiple UEs, study is in progress on the use of interleaved frequency division multiple access (IFDMA). IFDMA is a radio access scheme that combines characteristics of multicarrier access and single carrier access.

Also, assuming the case where DMRSs are multiplexed on even frequency resources among multiple UEs, study is underway to apply different cyclic shifts (CS) per DMRS. More specifically, it is studied to generate DMRSs by applying cyclic shifts to a predetermined base sequence.

However, since IFDMA-based DMRSs are not used in existing LTE (for example, LTE Rel. 8 to 13), it is not clear what configuration is appropriate. In addition, When an existing transmission power control method is applied to CS-based DMRSs, at least one UE that is multiplexed has increased transmission power, and this might make it difficult to separate DMRSs for multiple UEs at the base station. Without defining appropriate DMRS configuration and without executing proper power control, there is a risk that the throughput will be reduced or the received quality will be deteriorated.

So, the present inventors have come up with a method, whereby, even when demodulation reference signals for an uplink data channel are multiplexed in a short TTI, the demodulation reference signals can still be transmitted appropriately.

Now, embodiments of the present invention will be described in detail below with reference to the accompanying drawings. Note that the radio communication methods according to the herein-contained embodiments may be used individually or may be used in combination.

Radio Communication Method

First Embodiment

A first embodiment of the present invention relates to IFDMA-based DMRS multiplexing.

In IFDMA, in a similar way as in multi-carrier OFDMA, the entire band is divided into multiple narrowband frequency resources (for example, subcarriers). The divided narrowband frequency resources may be a set (subcarrier group) of multiple subcarriers that are arranged in a discrete manner (for example, aligned at equal intervals), and may be referred to as "comb-shaped (comb-tooth) resource set," from its appearance.

With IFDMA-based DMRSs, orthogonal radio access can be realized by multiplexing the DMRS of each UE in a comb-tooth shape so as to be nested with each other. Note that, IFDMA-based transmission signals can be generated using only signal processing in the time domain, as in single carrier access.

In the first embodiment, the number of combs supported (also referred to as the number of combs that can be supported, the number of comb patterns, etc.) may be reported to the UE via higher layer signaling (for example, RRC (Radio Resource Control) signaling, MAC (Medium Access Control) signaling, broadcast information, MIB (Master Information Block), SIB (System Information Block), etc.), physical layer signaling (for example, downlink control information (DCI), or a combination of these.

Also, the index of the comb (comb pattern) that is used to transmit DMRSs (hereinafter also referred to as "comb index") may be notified to the UE via higher layer signaling (for example, RRC signaling), physical layer signaling (for example, DCI), or a combination of these.

For example, if the number of combs supported (the total number of combs) is configured to two, 0 or 1 may be reported to the UE as the comb index. If the number of combs supported is configured to four, one of 0, 1, 2, and 3 may be reported to the UE as the comb index.

Note that, when the comb index is notified via physical layer signaling, an explicit field that is provided in the DCI format used for the sPUSCH scheduling may be used to report the comb index. For example, the cyclic shift (CS) field in a UL grant may be read as an indication of the comb index. Here, a UL grant refers to DCI that is equivalent to information for scheduling uplink data transmission (DCI in compliance with DCI format 0 or 4, for example).

The comb index and the CS index may be determined, for example, by following equations 1 and 2, respectively (the CS index truncates or rounds the value on the right side). Note that these equations are simply examples, and other equations based on the value of the CS field and the number of combs may be used.

$$\text{Comb index} = (\text{the value of the CS field}) \bmod (\text{the number of combs}) \quad \text{(Equation 1)}$$

$$\text{CS index} = (\text{the value of the CS field})/(\text{the number of combs}) \quad \text{(Equation 2)}$$

In the first embodiment, the number of frequency resources (for example, the number of PRBs) that can be scheduled is preferably limited by the number of combs supported. For example, if the number of combs=i (i is, for example, an integer of two or greater), the limitation may be: the number of PRBs scheduled (the number of PRBs in data)=i*N. Here, N is an integer equal to or greater than one, and may be a number of PRBs to match the bandwidth taking into account the comb-induced (toothless) gaps in the DMRSs.

In IFDMA-based DMRSs, the DMRS sequence length per PRB becomes 12/i, by setting the number of scheduled PRBs=i*N, the DMRS sequence length with respect to (mapped in) the entire comb can be made the same as the sequence length of DMRSs used in existing LTE.

Note that, depending on the number of combs, the size of the resource allocation (RA) field in a UL grant may vary (change). In this case, by adjusting the payload size, the overhead can be optimized.

The larger the number of combs, the smaller the bit width (the number of bits) in the RA field may be. For example, assuming that the bandwidth (for example, the system bandwidth) where data can be allocate is fifty PRBs, if the number of combs=two, the RA field has only to express up to 25, so that five bits will suffice. In the event the number of combs=four, the RA field has only to express up to 12, so it may be four bits will suffice.

Also, regardless of the number of combs, the size of the RA field in a UL grant may be the same. In this case, the length of DCI can be made constant regardless of the number of combs, so that blind decoding of DCI in the UE can be made a common process.

FIG. 1 is a diagram to show an example of resource mapping for IFDMA-based DMRSs. In FIG. 1, the number of symbols of the sPUSCH for UE 1 is two, and the number of symbols of the sPUSCH for UE 2 is three. The data (sPUSCH) of UE 1 is mapped to the second symbol in the drawing, and the data (sPUSCH) of UE 2 is mapped to the third and fourth symbols shown in the drawing.

Also, the number of combs is two, and the DMRSs for UE 1 and UE 2 are mapped to frequency resources constituting separate comb teeth in the leading one symbol shown in the drawing. Thus, even with sPUSCHs of different TTI durations, by sharing DMRS symbols, improvement of resource utilization efficiency can be expected. Furthermore, although FIG. 1 shows an example in which DMRSs are located in symbols before sPUSCHs, the present invention is not limited to this. A DMRS may be mapped to the same symbols as a sPUSCH, or may be mapped to subsequent symbols.

Preferably, IFDMA-based DMRSs are configured to support UL-MIMO (Uplink-Multi Input Multi Output). For example, DMRS of varying layers for UL-MIMO may be multiplexed using one of following (1) to (3):

(1) the same comb and different CSs;
(2) different combs and the same CS; and
(3) different combs and different CSs.

Note that the comb index and/or the index for each layer's DMRS may be reported via higher layer signaling, physical layer signaling, or a combination of these.

In sPUSCH transmission, UL-MIMO needs not be supported. For example, a UL-MIMO-configured UE does not have to assume that short TTIs may be configured. A UE where short TTIs are configured does not have to assume that UL-MIMO may be configured. This can reduce the processing load on the UE.

It may be supported that UL-MIMO and short TTIs are configured simultaneously. In this case, the UE does not have to monitor for UL grants for UL-MIMO (for example, DCI in compliance with DCI format 4) in search spaces of the sPDCCH (for example, common search space, UE-specific search space, etc.). As a result, the operation of monitoring for DCI format 4 in the PDCCH, while, not monitoring for this DCI in the sPDCCH that schedules the sPDSCH/sPUSCH for short TTIs, so that, even when UL-MIMO is configured, monitoring of DCI format 4 in the sPDCCH can be omitted, and the processing load of the UE can be reduced.

As explained above, according to the first embodiment, it is possible to appropriately perform resource mapping for DMRSs and sPUSCH even when multiplexing IFDMA-based DMRSs for the sPUSCH to overlapping resources among UEs.

Second Embodiment

In accordance with a second embodiment of the present invention, a power control scheme ensuring orthogonality when CS-based DMRSs is used is described.

First, uplink transmission power control in existing LTE will be described. In transmission power control for the PUSCH, the error due to open-loop control is corrected by closed-loop control using transmission power control (TPC) commands that are received from base stations. In existing LTE, the transmission power $P_{PUSCH,c}(i)$ of the PUSCH in subframe i of serving cell c can be represented by, for example, following equation 3:

$$P_{PUSCH,c}(i) = \min\left\{\begin{array}{l}P_{CMAX,c}(i),\\ 10\log_{10}(M_{PUSCH,c}(i)) + P_{O\_PUSCH,c}(j) + \alpha_c(j) \cdot PL_c + \Delta_{TF,c}(i) + f_c(i)\end{array}\right\} \quad \text{(Equation 3)}$$

In equation 3, $P_{CMAX,c}(i)$ is the maximum possible transmission power (maximum allowable transmission power) of a UE in cell c, $M_{PUSCH,c}(i)$ is the transmission bandwidth (the number of resource blocks) of the PUSCH, j is a predetermined PUSCH-related index (for example, an index to represent the type of scheduling), $P_{O\_PUSCH,c}(j)$ is the value to indicate the target received power of the PUSCH, $\alpha_c(j)$ is the coefficient to multiply $PL_c$ by, $PL_c$ is the downlink path loss calculated by the UE, $\Delta_{TF,c}(i)$ is the offset value according to the transmission format, and $f_c(i)$ is the correction value based on TPC commands (for example, a cumulative value of TPC commands, a TPC command-based offset amount, etc.).

$P_{O\_PUSCH,c}(j)$, $\alpha_c(j)$, and others may be reported by higher layer signaling (for example, broadcast information). Hereinafter. "(i)," "(j)," "c" and others may be omitted when each parameter is written. For example, $\alpha_c(j)$ may be simply expressed as "α."

The transmission power of the DMRS for decoding the PUSCH may be the same as the transmission power of the PUSCH. In this case, the transmission power of the DMRS, $P_{DMRS,c}(i)=P_{PUSCH,c}(i)$ holds.

Figure 2:
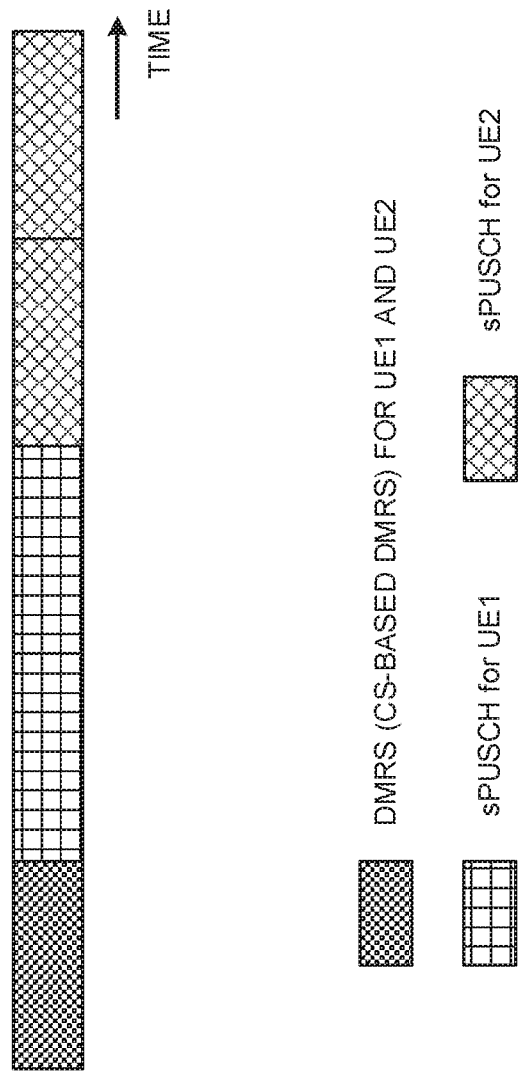
FIG. 2 is a diagram to show an example where multiple UEs multiplex CS-based DMRSs in the same frequency resource.

Now, the target received power of CS-based DMRSs is preferably the same among multiplexed UEs. This reason will be explained with reference to FIG. 2. FIG. 2 is a diagram to show an example in which a plurality of UEs multiplexes CS-based DMRSs on the same frequency resource.

In the first symbol shown in the drawing, two DMRSs for UE 1 and UE 2 are code-division multiplexed (CDM). Furthermore, data (sPUSCH) for UE 1 is transmitted in the second and third symbols, and data (sPUSCH) for UE 2 is transmitted in the fourth and fifth symbols.

In this case, a so-called near-far problem may occur. That is, if the transmission power of one of the DMRSs for UE 1 and the UE 2 is significantly larger than the other, it becomes difficult to separate the DMRSs.

[Power Control based on PUSCH Algorithm]

As one solution to the above problem, the present inventors have found out calculate the transmission power of DMRSs for use for the sPUSCH based on an equation that fixes α=1 in the conventional PUSCH power calculation equation and replaces the PUSCH with an sPUSCH. This makes it possible to suppress excessive DMRS transmission power adjustment due to path loss, and facilitate demultiplexing of DMRSs. In addition, in existing LTE, although information of a having a value between 0 and 1 is reported to the UE via higher layer signaling, according to the present embodiment, such configuration is unnecessary, and therefore signaling overhead can be reduced.

Note that the DMRS, with reference to which power control will be described below, is the DMRS for the sPUSCH to correspond to UL grants for semi-persistent scheduling and/or UL grants for dynamic scheduling. This DMRS is not the DMRS for the sPUSCH corresponding to the random access response grants. That is, this DMRS is the DMRS for the sPUSCH to correspond to UL grants received after RRC connection is established (after completion of random access procedures).

The transmission power of the DMRS used in the sPUSCH may be determined by equation 4, regardless of whether the UE transmits the PUCCH and/or sPUCCH (hereinafter also referred to as "(s) PUCCH") simultaneously with the sPUSCH:

$$P_{DMRS,c}(i) = \min\left\{\begin{array}{l}P_{CMAX,c}(i),\\ 10\log_{10}(M_{sPUSCH,c}(i)) + P_{O\_sPUSCH,c}(j) + PL_c + \Delta_{TF,c}(i) + f_c(i)\end{array}\right\} \quad \text{(Equation 4)}$$

In equation 4, $M_{sPUSCH,c}(i)$ is the transmission bandwidth (for example, the number of resource blocks) of the sPUSCH, j is a predetermined PUSCH-related index (for example, an index to indicate the type of scheduling), $P_{O\_PUSCH,c(j)}$ is a value to indicate the target received power of the sPUSCH.

Furthermore, the transmission power of the DMRS used in the sPUSCH may be determined based on different equations depending on whether or not the UE transmits the (s)PUCCH simultaneously with the sPUSCH.

For example, if the UE transmits the sPUSCH in serving cell c and does not transmit the (s)PUCCH at the same time, the transmission power of the DMRS used in the sPUSCH may be determined based on above equation 4.

Also, when the UE transmits the sPUSCH in serving cell c and simultaneously transmits the (s)PUCCH, the transmission power of the DMRS used in the sPUSCH may be determined by equation 5 below.

$$P_{DMRS,c}(i) = \min\left\{ \begin{array}{l} 10\log_{10}(\hat{P}_{CMAX,c}(i) - \hat{P}_{(s)PUCCH}(i)), \\ 10\log_{10}(M_{sPUSCH,c}(i)) + P_{O\_sPUSCH,c}(j) + PL_c + \Delta_{TF,c}(i) + f_c(i) \end{array} \right\}$$ (Equation 5)

where $\hat{P}_{CMAX,c}(i)$ is the linear value of $P_{CMAX,c}(i)$, and $\hat{P}_{(s)PUCCH}(i)$ is the linear value of the transmission power of the (s)PUCCH in subframe i.

Also, if the UE does not transmit the sPUSCH in serving cell c, regarding the cumulative value of TPC commands received in DCI format 3/3A for the sPUSCH, the UE may assume that the transmission power of the DMRS in subframe i of cell c is determined by equation 6 below:

$$P_{DMRS,c}(i) = \min\{P_{CMAX,c}(i), P_{O\_sPUSCH,c}(l) + PL_c + f_c(i)\}$$ (Equation 6)

Note that α (DMRS path loss coefficient) that is used to calculate the transmission power of the DMRS and α (sPUSCH path loss coefficient) that is used to calculate the transmission power of (the data symbols of) the sPUSCH may be different, or may be the same.

For example, when the DMRS path loss coefficient is 1, the sPUSCH path loss coefficient may be less than 1. By making the DMRS path loss coefficient 1, it is expected to solve the near-far problem with CS-based DMRSs. Also, by making the sPUSCH path loss coefficient less than 1, reduced inter-cell interference can be expected. Such power control works particularly well when using power-independent modulation schemes (for example, phase shift keying-based modulation schemes such as BPSK (Binary Phase Shift Keying) and QPSK (Quadrature Phase Shift Keying)).

When the DMRS path loss coefficient and the sPUSCH path loss coefficient are the same, the transmission powers of the two become equal, so that demodulation of signals that are transmitted using higher-order modulation schemes (for example, 64QAM (Quadrature Amplitude Modulation)) might become easier.

[SRS Algorithm-Based Power Control]

As another solution to the above problem, the present inventors have found out that the transmission power of DMRS used in the sPUSCH may be controlled in an enhanced way based on an existing SRS power control scheme. In existing LTE, the transmission power $P_{SRS,c}(i)$ of SRS in subframe i of serving cell c can be represented by, for example, following equation 7:

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}$$ (Equation 7)

In equation 7, $P_{SRS\_OFFSET,c}(m)$ is the offset that is configured by higher layer signaling, $M_{SRS,c}(i)$ is the transmission bandwidth (the number of resource blocks) of the SRS, and the rest of the parameters are the same as in equation 1.

In this way, existing SRS transmission power is calculated apart from the PUSCH transmission power. Therefore, the present inventors have come up with the idea of calculating the transmission power of DMRSs used in sPUSCH based on equation 5, and found that the transmission power can be calculated based on equation 8 below, for example:

$$P_{DMRS,c}(i) = \min\{P_{CMAX,c}(i), P_{DMRS\_OFFSET,c}(m) + 10\log_{10}(M_{DMRS,c}) + P_{O\_PUSCH,c}) + \alpha_c(j) \cdot PL_c + f_c(i)\}$$ (Equation 8)

In equation 8, $P_{DMRS\_OFFSET,c}(m)$ is the offset (DMRS offset) that is configured by higher layer signaling (for example, RRC signaling) or physical layer signaling (for example, DCI), and $M_{DMRS,c}(i)$ is the transmission bandwidth of the DMRS (for example, the number of resource blocks). Note that the DMRS offset is preferably commanded dynamically by DCI.

According to equation 8, the transmission power of a DMRS used in the sPUSCH is calculated based on the offset parameter for the DMRS and the transmission bandwidth of the DMRS. In this case, it is possible to perform fractional TPC (path loss correction) using $\alpha_c(j)$ and adjust the signal-to-noise ratio (SNR) based on the DMRS offset.

(Variations)

In the second embodiment, transmission power control for CS-based DMRSs has been described, but the present invention is not limited to this. For example, transmission power control for non-CS-based DMRSs may be performed according to the example of the second embodiment.

The IFDMA-based DMRS shown in the first embodiment may be subjected to transmission power control according to the second embodiment. In this case, $M_{DMRS,c}(i)$ in equation 8 above may be the bandwidth corresponding only to the band where the DMRS is actually mapped (for example, the bandwidth subtracting the comb-induced gaps produced in the DMRS from the PUSCH bandwidth), the bandwidth (PUSCH bandwidth) including the comb-induced gaps in the DMRS, or a bandwidth based on either of these.

Also, in the first and/or the second embodiment, when the UE is configured to transmit a long TTI (for example, 1 ms TTI) and a short TTI in a predetermined carrier, different power control parameters may be configured between channels having different TTI durations.

For example, $P_O$ ($P_{O\_PUSCH,c}$) and α for the PUSCH, $P_O$ ($P_{O\_sPUSCH,c}$) and α for the sPUSCH, $P_O$ ($P_{O\_PUCCH,c}$) for the PUCCH, $P_O$ ($P_{O\_sPUCCH,c}$) for the sPUCCH and so on may be configured in different values in the UE, may be configured in the same value in part, or other values may be calculated based on a certain value that is configured.

These power control parameters may be configured by higher layer signaling (for example, RRC signaling) or physical layer signaling (for example, DCI). Note that $P_{O\_PUCCH,c}$ and $P_{O\_sPUCCH,c}$ are values indicating the target received powers of the PUCCH and the sPUCCH, respectively.

Correction values (for example, $f_c(i)$ in equations 3 to 8) based on TPC commands may be used in common (the same value may be used for both) among channels having different TTI durations. By this means, even when the transmission TTI duration is switched, the UE can take over the correction information of closed loop control and transmission power control to achieve the target SINR (Signal to Interference plus Noise Ratio) can be suitably performed.

Also, between channels having different TTI durations, correction values based on TPC commands may be used independently (individual values may be used for both). In this case, in transmission power control, the UE updates the correction value using the latest correction value for each transmission TTI duration. In this case, deterioration of characteristics can be reduced compared to the case of resetting the correction value based on TPC commands at the time of switching the TTI duration.

Note that in each equation exemplified in the second embodiment, i is not limited to an index indicating a subframe, and may be an index indicating another period (for example, slot, symbol, etc.).

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 3:
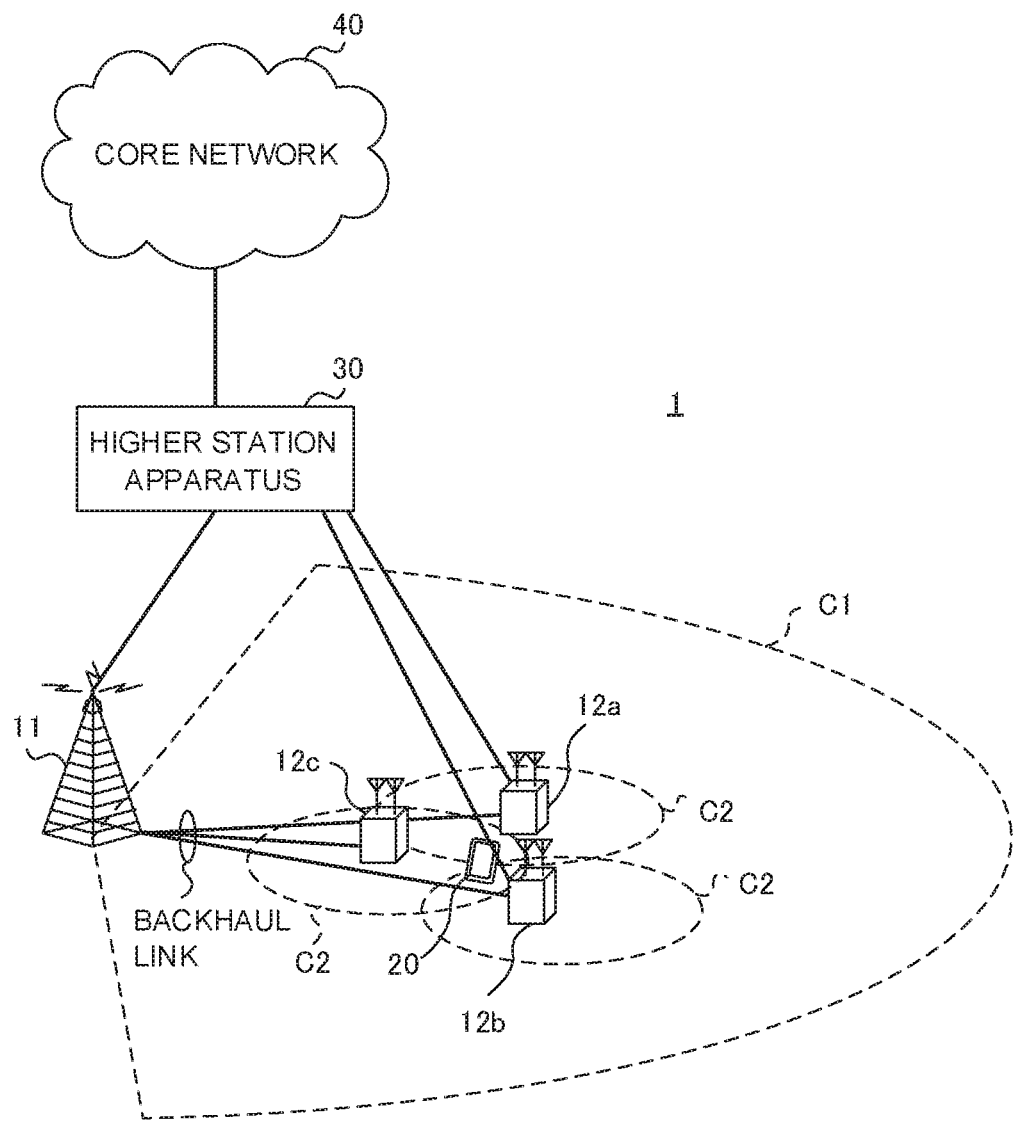
FIG. 3 is a diagram to show an example of a schematic structure of a radio communication system according to one embodiment of the present invention.

FIG. 3 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)." "FRA (Future Radio Access)." "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. The arrangements and numbers of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station." a "central node." an "eNB (eNodeB)," a "transmitting/receiving point" and so on. Also, the radio base stations 12 are radio base stations having local coverages, and may be referred to as "small base stations," "micro base stations." "pico base stations," "femto base stations," "HeNBs (Home eNodeBs)." "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information." "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, in the PUCCH, downlink radio quality information (CQI: Channel Quality Indicator), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRSs may be referred to as "user terminal-specific reference signals (UE-specific reference signals). Also, the reference signals to be communicated are by no means limited to these.

(Radio Base Station)

Figure 4:
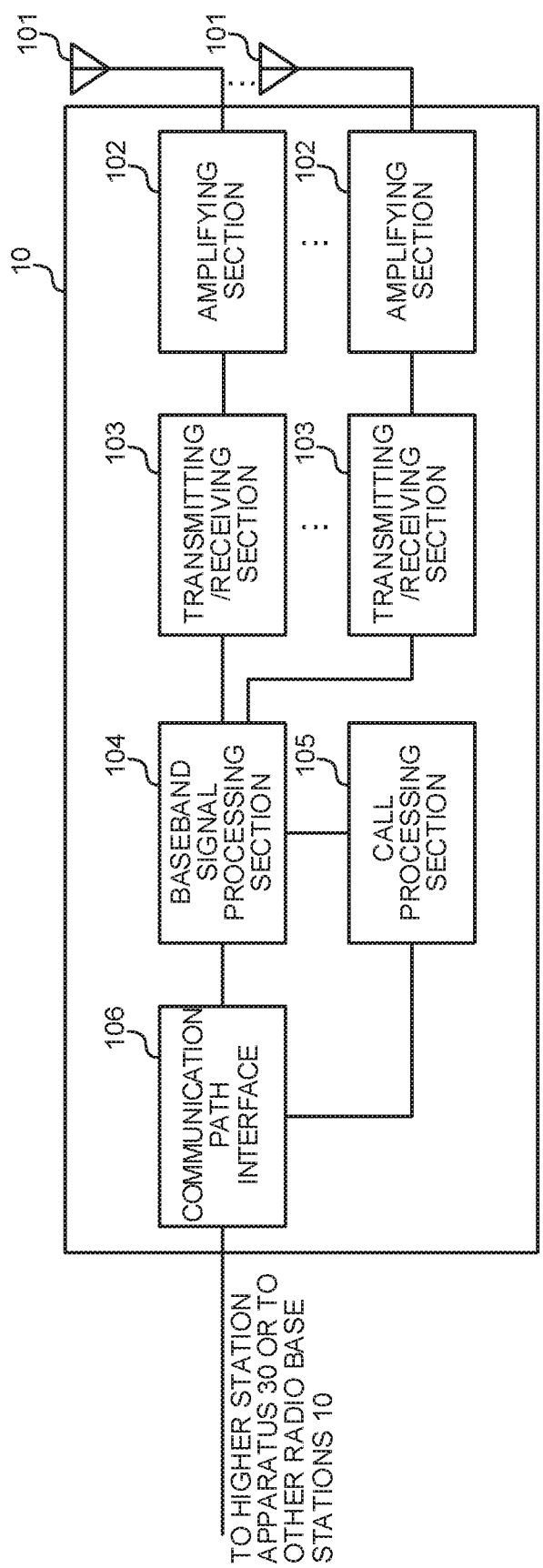
FIG. 4 is a diagram to show an example of an overall structure of a radio base station according to one embodiment of the present invention.

FIG. 4 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 may transmit and/or receive signals using multiple TTIs of varying lengths (TTI durations). For example, in one or more carriers (cells, CCs, etc.), the transmitting/receiving sections 103 may receive signals using a first TTI (for example, a long TTI) and a second TTI (for example, a short TTI) with a shorter TTI duration than the first TTI.

For example, the transmitting/receiving sections 103 receive uplink signals transmitted from the user terminal 20 using the PUCCH, the PUSCH, the sPUCCH, the sPUSCH and/or others. Also, the transmitting/receiving sections 103 receive the DMRS for at least one of these channels. The transmitting/receiving sections 103 may transmit at least one of information about the number of combs supported, the comb index, the CS index, the DMRS offset and the transmission bandwidth of the DMRS, to the user terminals 20.

Figure 5:
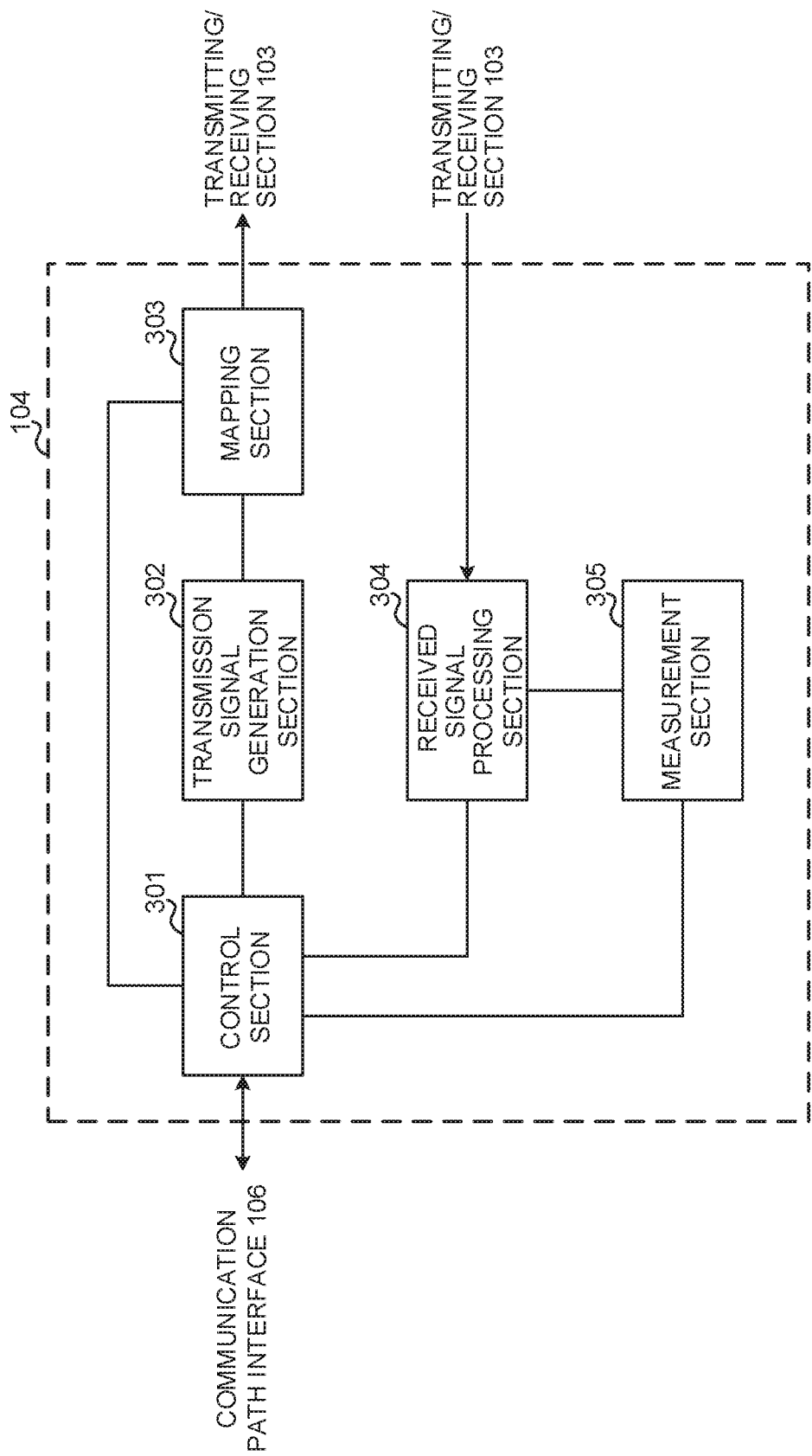
FIG. 5 is a diagram to show an example of a functional structure of a radio base station according to one embodiment of the present invention.

FIG. 5 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls scheduling (for example, resource allocation) of system information, downlink data signals (for example, signals transmitted in the PDSCH) and downlink control signals (for example, signals transmitted in the PDCCH and/or the EPDCCH, such as delivery acknowledgement information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 may control scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals and so on.

The control section 301 controls the transmission and/or reception of signals in one or more CCs by using a first TTI (for example, a long TTI, a subframe, a slot, etc.) and a second TTI (for example, a short TTI, an sTTI, a minislot, etc.) with a shorter TTI duration than the first TTI.

For example, the control section 301 exerts control so that a demodulation reference signal (DMRS) for an uplink data channel (for example, an sPUSCH) in a second TTI, which is shorter than a first TTI, is received.

The control section 301 may exert control so that a DMRS for a sPUSCH is received in a comb-shaped resource set. Also, the control section 301 may exert control so that an sPUSCH (data signal) is received in frequency resources of bandwidths associated with the number of combs supported. Note that these bandwidths are preferably an integer multiple of the number of combs supported.

The control section 301 may perform control so that information (predetermined field) to allow the user terminal 20 to determine the comb index is included in DCI and transmitted to the user terminal 20.

Furthermore, the control section 301 may exert control so that downlink control information (which may be referred to as "UL grant") for scheduling transmission of an uplink data channel (sPUSCH) in a second TTI, which is shorter than a first TTI, is transmitted to the user terminal 20.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), trans mission path information (for example, CSI), and so on. The measurement results may be output to the control section 301.

(User Terminal)

Figure 6:
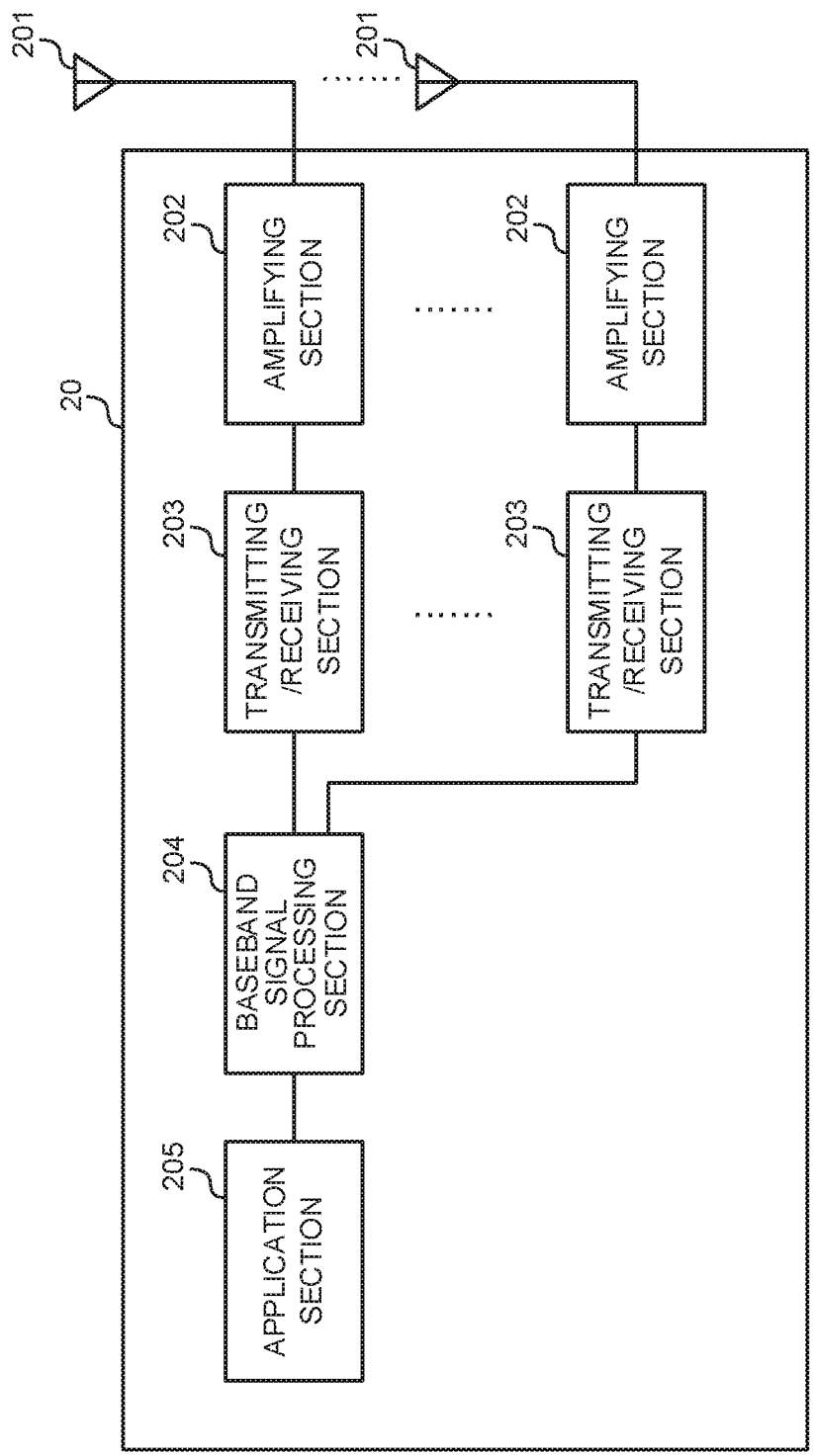
FIG. 6 is a diagram to show an example of an overall structure of a user terminal according to one embodiment of the present invention.

FIG. 6 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 may transmit and/or receive signals using multiple TTIs of varying lengths (TTI durations). For example, in one or more carriers (cells, CCs, etc.), the transmitting/receiving sections 203 may transmit signals using a first TTI (for example, a long TTI) and a second TTI (for example, a short TTI) with a shorter TTI duration than the first TTI.

For example, the transmitting/receiving sections 203 transmit uplink signals to the radio base station 10 using the PUCCH, the PUSCH, the sPUCCH, the sPUSCH and/or others. Also, the transmitting/receiving sections 203 transmit the DMRS for at least one of these channels.

The transmitting/receiving sections 203 may receive at least one of information about the number of combs supported, the comb index, the CS index, the DMRS offset and the transmission bandwidth of the DMRS, from the radio base station 10.

Figure 7:
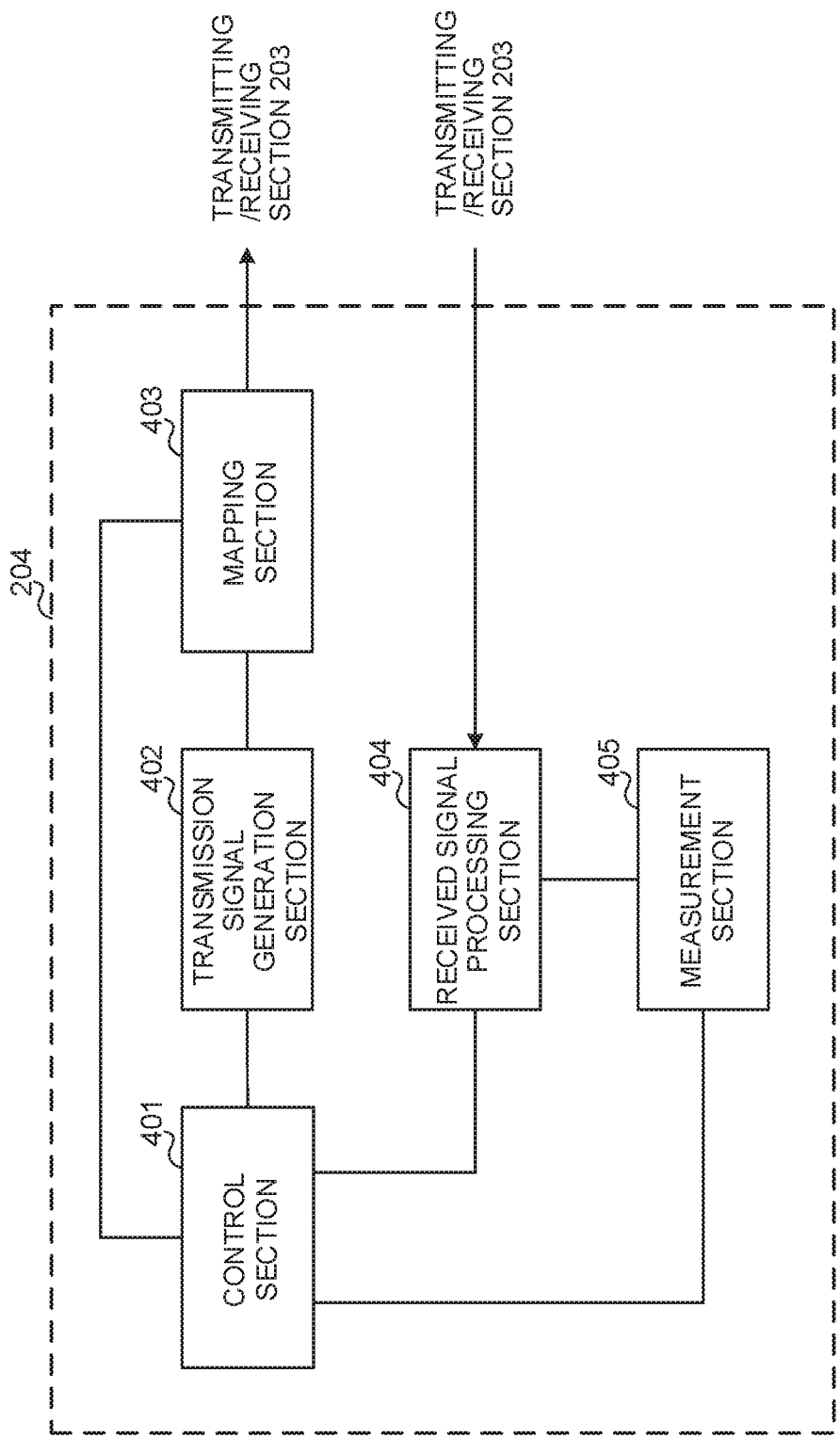
FIG. 7 is a diagram to show an example of a functional structure of a user terminal according to one embodiment of the present invention.

FIG. 7 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

In one or more CCs, the control section 401 controls the transmission and/or reception of signals using a first TTI (for example, a long TTI, a subframe, a slot, etc.) and a second TTI (for example, a short TTI, an sTTI, a minislot, etc.) having a shorter TTI duration than the first TTI.

For example, the control section 401 controls transmission of a demodulation reference signal (DMRS) for an uplink data channel (for example, sPUSCH) in a second TTI that is shorter than the first TTI.

The control section 401 may exert control for mapping DMRSs for the sPUSCH to a comb-shaped resource set. In addition, the control section 401 may map the sPUSCH (data signal) to frequency resources of bandwidths associated with the number of combs supported, which is obtained from the received signal processing section 404. Note that these bandwidths are preferably an integer multiple of the number of combs supported.

Based on a predetermined field (for example, the CS field) included in DCI obtained from the received signal processing section 404, the control section 401 may identify the index (comb index) corresponding to the comb-shaped resource set.

In addition, the control section 401 may control transmission of the sPUSCH based on downlink control information (which may be referred to as a "UL grant") for scheduling transmission of an uplink data channel (sPUSCH) in a second TTI, which is shorter than a first TTI.

The control section 401 may control transmission of a DMRS for the sPUSCH, which is commanded by a UL grant, after RRC connection is established (after completion of the random access procedures), and calculate the transmission power of the DMRS based on an equation (for example, equations 4 to 6), in which the coefficient (for example, $\alpha_c(j)$) for multiplying the downlink path loss estimation value ($PL_c$) is fixed to 1. Note that even before random access procedures are finished, the transmission power of the DMRS for the sPUSCH may be calculated based on an equation in which the coefficient for multiplying the downlink path loss estimation value is fixed to 1.

In other words, the control section 401 may calculate the transmission power of a DMRS using an equation, which includes a downlink path loss estimation value ($PL_c$), and in which there is no term where the path loss estimation value is multiplied by a value less than 1.

The control section 401 may calculate the transmission power of a DMRS for the sPUSCH based on the same equation regardless of whether the sPUSCH in the second TTI is transmitted simultaneously with an uplink control channel ((s)PUCCH). Also, when the sPUSCH is transmitted simultaneously with a PUCCH and/or an sPUCCH, the control section 401 may calculate the transmission power of a DMRS for the sPUSCH based on a different equation.

The control section 401 may calculate the transmission power of a DMRS used in the sPUSCH based on an offset parameter for the DMRS and the transmission bandwidth of the DMRS.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information. RRC signaling. DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 8:
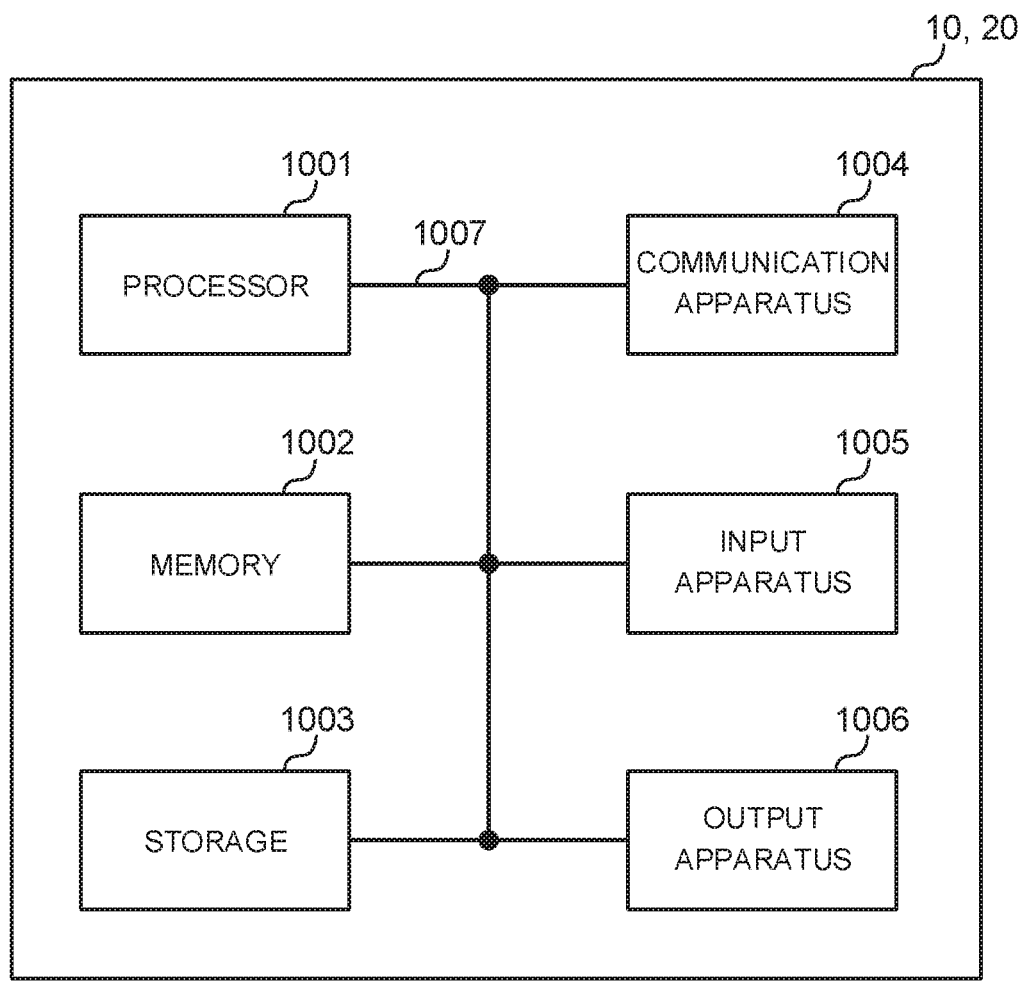
FIG. 8 is a diagram to show an example of a hardware structure of a radio base station and a user terminal according to one embodiment of the present invention.

For example, the radio base station, user terminals and so on according to embodiments of the present invention may function as a computer that executes the processes of the radio communication method of the present invention. FIG. 8 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus.

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling"). Also, "signals" may be "messages. A reference signal may be abbreviated as an "RS." and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe. Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval" (TTI), or a plurality of consecutive subframes may be referred to as a "TTI," or one slot or minislot may be referred to as a "TTI. That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "minislot," "a subslot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals). "L1 control information" (L1 control signal) and so on. Also, RRC signaling may be referred to as "RRC messages." and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)." "radio base station," "eNB." "cell." "sector," "cell group," "carrier," and "component carrier" may be used interchangeably. A base station may be referred to as a "fixed station." "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit." "wireless unit," "remote unit," "mobile device," "wireless device," "wireless communication device," "remote device," "mobile subscriber station," "access terminal," "mobile terminal," "wireless terminal," "remote terminal." "handset," "user agent," "mobile client." "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side. For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on.

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-017128, filed on Feb. 1, 2017, including the specification, drawings and abstract, is incorporated herein by reference in its entirety.

The invention claimed is:

1. A terminal comprising:
a processor that maps a demodulation reference signal for a physical uplink shared channel (PUSCH) to a set of equally spaced multiple subcarriers based on information of the demodulation reference signal; and
a transmitter that transmits the demodulation reference signal,
wherein the processor applies transmission power control to the demodulation reference signal, which is different from transmission power control applied to a demodulation reference signal for a PUSCH that is not mapped to the set of equally spaced multiple subcarriers.

2. The terminal according to claim 1, wherein the information of the demodulation reference signal is a cyclic shift field included in a downlink control information for scheduling the PUSCH.

3. The terminal according to claim 2, wherein the demodulation reference signal is a demodulation reference signal for the PUSCH in a Transmission Time Interval (TTI) shorter than a subframe.

4. The terminal according to claim 1, wherein the demodulation reference signal is a demodulation reference signal for the PUSCH in a Transmission Time Interval (TTI) shorter than a subframe.

5. A radio communication method for a terminal, comprising:
mapping a demodulation reference signal for a physical uplink shared channel (PUSCH) to a set of equally spaced multiple subcarriers based on information of the demodulation reference signal; and
transmitting the demodulation reference signal,
wherein the terminal applies transmission power control to the demodulation reference signal, which is different from transmission power control applied to a demodulation reference signal for a PUSCH that is not mapped to the set of equally spaced multiple subcarriers.

6. A base station comprising:
a transmitter that controls to transmit, to a terminal, information of demodulation reference signal for a physical uplink shared channel (PUSCH), the information being used to map the demodulation reference signal to a set of equally spaced multiple subcarriers; and
a receiver that receives, from the terminal, the demodulation reference signal,
wherein transmission power control is applied to the demodulation reference signal, which is different from transmission power control applied to a demodulation reference signal for a PUSCH that is not mapped to the set of equally spaced multiple subcarriers.

7. A system comprising:
a terminal that comprises:
a processor that maps a demodulation reference signal for a physical uplink shared channel (PUSCH) to a set of equally spaced multiple subcarriers based on information of the demodulation reference signal; and
a transmitter that transmits the demodulation reference signal; and
a base station that comprises:
a transmitter that controls to transmit the information to the terminal; and
a receiver that receives the demodulation reference signal from the terminal,
wherein the terminal applies transmission power control to the demodulation reference signal, which is different from transmission power control applied to a demodulation reference signal for a PUSCH that is not mapped to the set of equally spaced multiple subcarriers.

* * * * *